United States Patent [19]

Prueter

[11] Patent Number: 4,655,481
[45] Date of Patent: Apr. 7, 1987

[54] PIPE ALIGNING AND JOINING

[75] Inventor: Elton D. Prueter, Saginaw, Mich.

[73] Assignee: The Dow Chemical Company, Midland, Mich.

[21] Appl. No.: 744,835

[22] Filed: Jun. 14, 1985

[51] Int. Cl.[4] ............................ F16L 9/14; F16L 23/00
[52] U.S. Cl. ........................................ 285/24; 285/55; 285/408; 285/367; 29/464
[58] Field of Search ................... 285/408, 367, 24, 55, 285/411; 24/279, 284; 29/464

[56] References Cited

U.S. PATENT DOCUMENTS

| 2,675,253 | 4/1954 | Stade | 285/408 |
| 4,189,172 | 2/1980 | Perrin | 285/367 X |
| 4,313,625 | 2/1982 | West | 285/408 X |
| 4,438,960 | 3/1984 | Carroll et al. | 285/408 X |
| 4,568,109 | 2/1986 | Prueter | 285/367 X |

Primary Examiner—Thomas F. Callaghan
Attorney, Agent, or Firm—R. B. Ingraham; Thomas D. Zindrick

[57] ABSTRACT

At least one pressure deformable insert is provided in a split ring "V" clamp for flanged plastic lined pipe to aid in alignment of piping elements being joined.

7 Claims, 5 Drawing Figures

PIPE ALIGNING AND JOINING

For many years pipe and like conduit has been employed to transport liquids of varying corrosive nature. Oftentimes materials which provide the desired resistance to corrosion do not provide adequate physical properties to resist the stresses normally applied to a pipe or similar conduit. Therefore, two-layer conduits have been employed wherein a corrosion resistant lining is applied to a conduit having the desired physical resistance, for example, rubber lined steel or wood lined steel pipe. Of considerable commercial importance are plastic lined steel pipes. Some such lined pipe is lined with a thermoset resin while others are lined with thermoplastic resins. For many applications a particularly desirable combination is a thermoplastic liner of substantial thickness; for example, in a 2-inch nominal pipe a liner may be as thick as 5 millimeters while the pipe wall may be on the order of 3.5 millimeters in thickness. Such lined pipe provides excellent service. However, it is relatively heavy, cumbersome to handle when used in situations where frequent disassembly is required. Further, a wide variety of joints is prepared by removing a terminal portion of the pipe, applying a flange to the pipe and subsequently flanging the protruding liner to conform to the flange. Such techniques are disclosed in U.S. Pat. Nos. 3,335,484; 3,383,750; 3,390,442; 3,448,491; 3,461,505; 3,650,550. Means of joining such pipes are disclosed in U.S. Pat. Nos. 3,284,107 and 3,284,108. Light weight plastic lined pipe is disclosed in U.S. Pat. No. 3,742,590. A particularly convenient means of flaring both pipe and liner simultaneously is disclosed in U.S. Pat. No. 3,744,115.

A particularly desirable joint for the assembly of light weight plastic lined, or light schedule plastic lined pipe as it is sometimes known, is set forth in U.S. Pat. No. 4,313,625, wherein a split "V" clamp engages loose rings disposed behind adjacent pipe flanges by tightening the split ring "V" clamp flanges and the plastic liners are brought into sealing engagement. Oftentimes in the assembly of such lined conduit employing split ring "V clamps in the field, alignment of the conduit ends at times is accomplished only with difficulty and may require temporary shimming or like temporary supports to obtain the desired alignment prior to application of a split ring "V" clamp.

It would be desirable if there were available an improved split ring "V" clamp which would aid in the alignment of adjacent flanged conduit ends.

It would also be desirable if there were available an improved split ring "V" clamp suitable for the preparation of the assembly of plastic lined pipe which would aid in the alignment of adjacent flanged ends of such pipe.

It would also be desirable if there were available an improved method for the assembly of flanged lined pipe alignments which minimized the problem of aligning ends prior to the application of a split ring "V" clamp.

These benefits and other advantages in accordance with the present invention are provided in an improved split ring "V" clamp, the split ring "V" clamp comprising at least first and second "V" clamp ring portions, the ring portions on assembly in clamping configuration defining a generally circular configuration, the circular configuration having a generally inwardly facing tapering annular groove adapted to receive flange members and as the portions of the split ring "V" clamp are drawn together to thereby force flange members toward each other and provide a desired connection between adjacent conduit member ends, the improvement which comprises providing a pressure deformable insert generally adjacent a flange engaging portion of the inwardly facing annular groove to provide in at least each portion of the split ring "V" clamp an axially extending region extending partially across the annular groove, the pressure deformable insert extending across the annular groove being positioned adjacent a minor diameter of the annular groove by pressure deformable support members.

Also contemplated within the scope of the present invention is a method for the assembly of conduit end portions wherein a split ring "V" clamp is disposed generally coaxially with the conduit ends, the split ring "V" clamp defining an inwardly facing annular groove wherein all opposing portions of said groove are adapted to engage flanges disposed on internal portions of the conduit members to thereby force said internal portions together to form a pipe joint, disposing within the groove a deformable insert which provides axially extending regions of contact with flanges of conduits joined drawing the portions of the split ring "V" clamp together to thereby initially align the flanges on the terminal portions of the conduit and deform the deformable insert on further drawing of the split ring "V" clamp members together to thereby provide a conduit joint.

Further features and advantages of the present invention will become more apparent from the following specification taken in connection with the drawing wherein.

Figure 4:
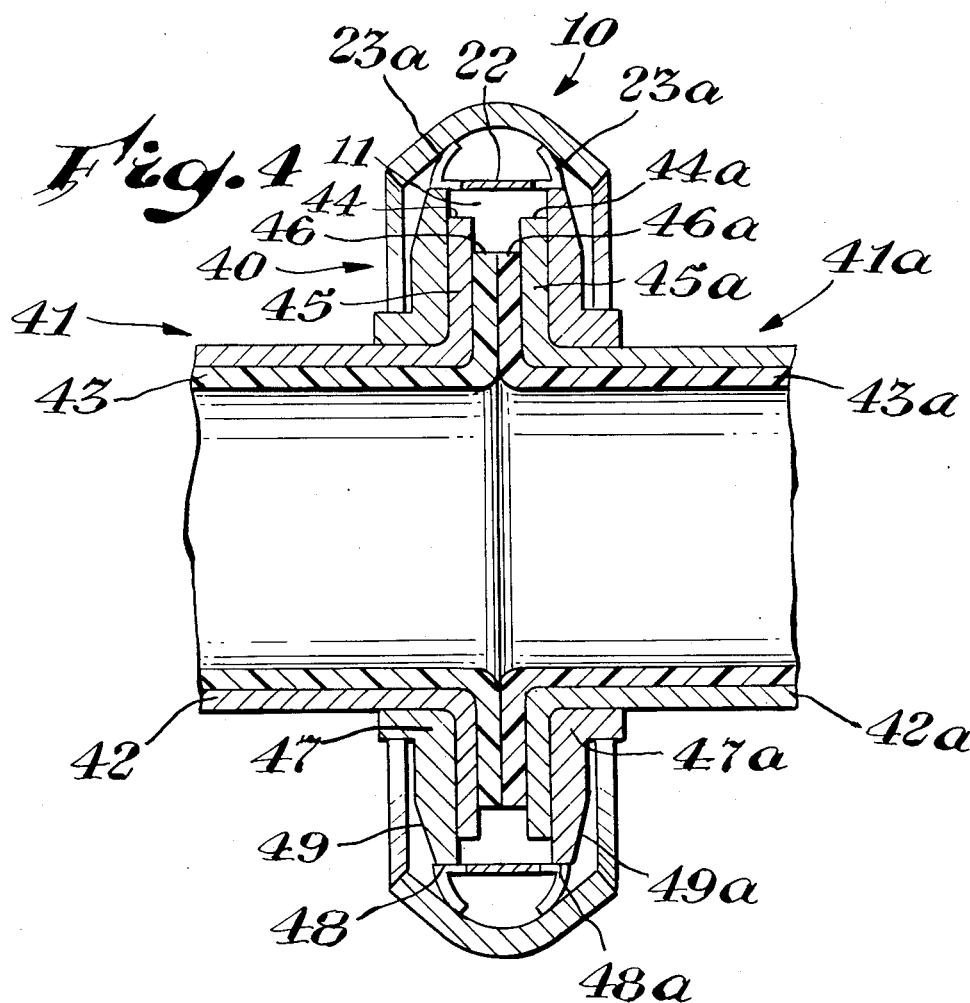
Figure 5:
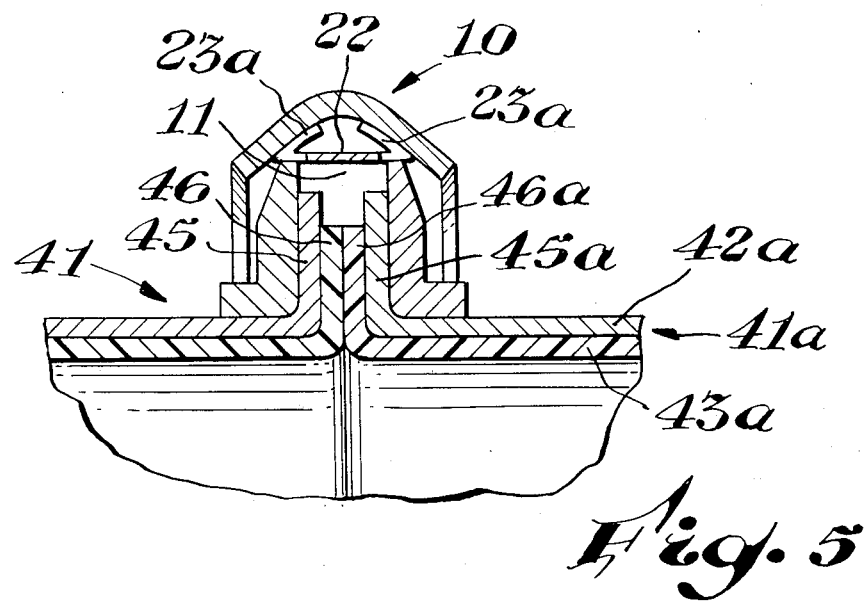

FIGS. 4 and 5 schematically depict a sectional view of a joint between two plastic lined conduits in accordance with the present invention.

Figure 1:
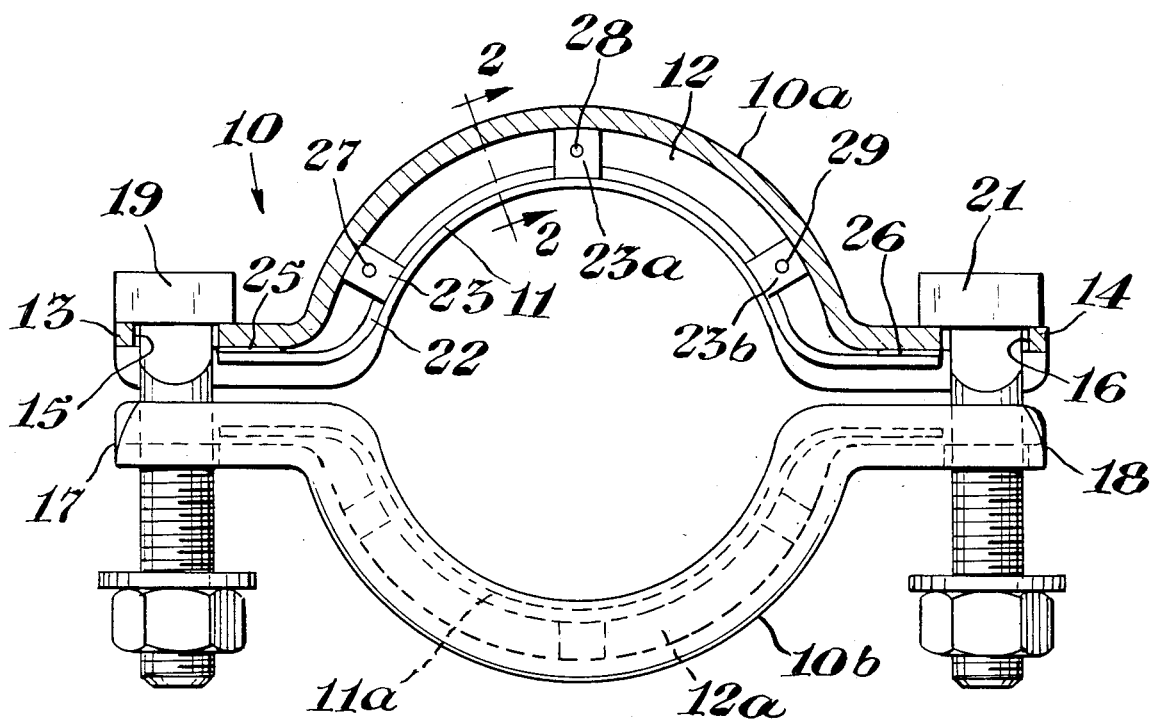
FIG. 1 is a partly in-section view of a split ring "V" clamp having disposed therein insert means in accordance with the invention.

In FIG. 1 there is schematically depicted a partially in section view of a split "V" clamp generally designated by the reference numeral 10. The split "V" clamp 10 has a first portion 10a and a second portion 10b. Portions 10a and 10b are of generally like configuration and have disposed within generally semi-annular grooves 12 and 12a respectively, and pressure deformable inserts 11 and 11a respectively. The semi-annular grooves 12 and 12a when the clamp is in an assembled position form a generally annular inwardly facing groove composed of portions 12 and 12a. The clamp portion 10a defines a generally radially projecting terminal portion 13 and oppositely disposed thereto a generally like terminal portion 14. The terminal portions 13 and 14 define bolt openings 15 and 16 respectively. Like bolt openings are defined in terminal portions 17 and 18 of clamp portion 10b. A bolt and nut assembly passes through opening 15 and a like opening in terminal portion 17 of second portion 10b. A similar bolt assembly 21 passes through opening 16 of terminal portion 14 and through an opening not shown in terminal portion 18 of clamp portion 10b. The insert 11 comprises a generally rectangular elongate body portion 22 extending from a location adjacent bolt opening 15 to a similar location adjacent the bolt opening 16. The insert 11 has affixed to the elongate body 22 a plurality of support members or ears 23, 23a and 23b. The members 23, 23a and 23b are affixed to the side of the elongate body 22 and depend generally radially outward therefrom, extending into the semi annular groove 12. The deformable member 11a is of like construction to the formable member 11. As depicted in FIG. 1, opposite ends of the deformable insert 11 are affixed to the clamp portion 10a by means of adhesive portion 25 and 26. The deformable insert 11a is similarly affixed to clamp portion 10b.

Figure 2:
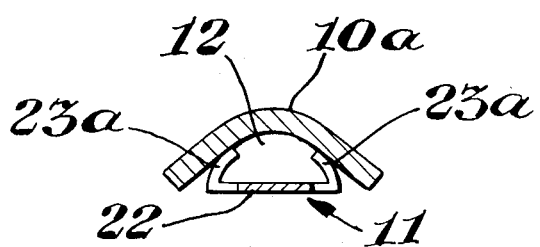
FIG. 2 is a sectional view through line 2—2 of FIG. 1.

In FIG. 2 there is depicted a cross sectional view of clamp portion 10a taken along the line 2—2 thereof, showing the insert 11 disposed within the semi annular clamp portion 10a, the body portion 22 of the insert having generally radially outwardly dependent support members 23a affixed thereto.

Figure 3:
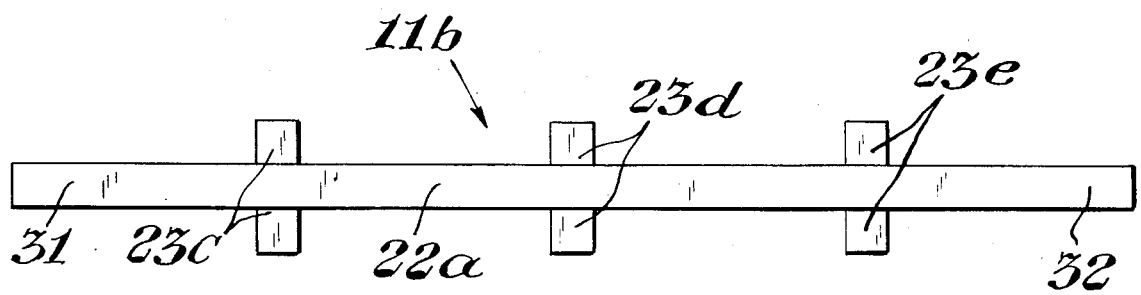
FIG. 3 shows a plan view of one variety of pressure deformable insert suitable for the practice of the present invention.

In FIG. 3 there is schematically depicted a planar blank generally designated by the reference numeral 11b. The blank 11b comprises an elongate body portion 22a having a first end 31, and a second end 32. Intermediate between the ends 31 and 32 are pairs of the generally planar projections indicated by the reference numerals 23c, 23d and 23e. The blank 22a of FIG. 3 is radially deformed to a configuration as depicted in FIGS. 1 and 2. Such deformation may be by means of an appropriate die and the so formed insert positioned within the clamp ring portion and adhered thereto by means of an organic adhesive such as an epoxy resin, rubber cement, phenolic resin adhesive and the like. Under conditions prior to use, very little force is exerted on the insert, and a high degree of adhesion generally is not necessary. A particularly convenient means of adhering the insert is to apply adhesive only to locations indicated by the reference numerals 25 and 26 of FIG. 1.

In FIG. 4, there is depicted a conduit joint in accordance with the present invention generally designated by numeral 40. The conduit joint comprises a first conduit 41 and a second conduit 41a of similar construction wherein like components are designated by like reference numerals having the suffix "a". The conduit 41 has a generally hollow cylindrical metal body 42 having disposed therein a hollow deformable plastic liner 43. The conduit 41 terminates in a flange generally designated by the reference numeral 44. Flange 44 is generally radially outwardly extending and comprises a first or metal portion 45 and a sealing or plastic liner portion 46 which is in engagement with like sealing or plastic liner portion 46a. Loose rings 47 and 47a are disposed about the conduits respectively. The loose ring has a generally planar radially extending face 48 disposed immediately adjacent the flange 44. The loose ring 47 has a tapered face 49 which tapers toward the flange 44 and is disposed remote therefrom. A deformable insert 11 is disposed between the split "V" ring clamp 10, and the loose rings 47 and 47a and/or the flanges 44 and 44a. The deformable insert has a body portion 22 having generally radially outwardly dependent support members 23a which provide axially extending regions of contact with the loose rings and/or flanges of lined conduits. The deformable insert 11 will align the flanges when the pipes are initially drawn.

FIG. 5 is a fractional view of the joint shown in FIG. 4, but depicts the conduit joint on further drawing of the split ring "V" clamp members together, whereby the generally radially outwardly dependent support members 23a of the deformable insert are deformed to provide a conduit joint.

Generally it is desirable that width of the insert such as the insert 22 be from 40 to 90 percent of the width of the annular groove and beneficially from about 45 to 90 percent of the annular groove width. Piping systems prepared in accordance with the present invention are particularly convenient for assembly of piping systems which do not employ fixed bolted flanges, and any element in the system may be rotated to any desired degree and readily clamped in sealing relationship. Such systems are disclosed in U.S. Pat. No. 4,313,625. The present invention provides joints of remarkable desirability when subjected to heating and cooling cycles. Tightening of the joints is not required as frequently with thermoplastic lines as employed in more rigid systems. It is believed that the split ring conduit flanges of the split "V" clamp provide a degree of resiliency which tends to reduce cold flow of the linear flange while maintaining reliable sealing pressure. Joints in accordance with the present invention show excellent load bearing properties, particularly when placed under loads which are coaxial with the conduits. Such joints whether conduit-toconduit or conduit-to-fitting are satisfactory for services to 150 pounds per square inch when a Schedule 10 steel conduit is employed with a plastic lining having a thickness of 1/16 of an inch.

The use of the deformable inserts alone or in combination with adhered loose rings provides a piping system which is particularly conveniently assembled in that when it is attempted to apply a split "V" clamp, the deformable liner or liner portions within the "V" clamp tend to align the loose rings and subsequently the ends of the conduit members being joined, thus significantly reducing the labor and time required for preparing joint assemblies while retaining all of the convenience of the pipe joint of U.S. Pat. No. 4,313,625.

Other fittings such as tees and Y's crosses, reducers, blind flanges, caps and the like are readily prepared for use with the present invention. The tapering flange configuration is readily employed with such a variety of fittings. Valves for use with the present invention beneficially are prepared from conventional flanged valves where the conventional flange is turned or milled to a tapered configuration.

Deformable insert blanks such as the blank 22a of FIG. 3 are readily prepared from a wide variety of plastic deformable materials which include metals, plastics, paper and the like. Such inserts are most readily prepared by stamping from a planar sheet of plastically deformable material.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An improved split ring "V" clamp, the split ring "V" clamp comprising at least first and second "V" clamp ring portions, the ring portions on assembly in clamping configuration defining a generally circular configuration, the circular configuration having a generally inwardly facing tapering annular groove adapted to receive flange members and as the portions of the split ring "V" clamp are drawn together to thereby force flange members toward each other and provide a desired connection between adjacent conduit member ends, the improvement which comprises providing a pressure deformable generally arcuate insert generally adjacent a flange engaging portion of the inwardly facing annular groove to provide in at least each portion of the split ring "V" clamp an axially extending region extending partially across the annular groove, the pressure deformable insert extending across the annular groove being positioned adjacent a minor diameter of the annular groove by at least two generally radially projecting pressure deformable support members.

2. The "V" clamp of claim 1 wherein the deformable insert is metal.

3. The "V" clamp of claim 2 wherein the deformable metal insert comprises two generally semicircular members.

4. The "V" clamp of claim 1 including an adhesive material affixing the insert portions within the clamp portions.

5. A method for the assembly of conduit end portions wherein a split ring "V" clamp is disposed generally coaxially with the conduit ends, the split ring "V" clamp defining an inwardly facing annular groove wherein opposing portions of said groove are adapted to engage flanges disposed on internal portions of the conduit members to thereby force said internal portions together to form a pipe joint, disposing within the groove a deformable generally arcuate insert being positioned adjacent a minor diameter of the annular groove by at least two generally radially projecting deformable support members, said insert providing axially extending regions of contact with flanges of conduits joined drawing the portions of the split ring "V" clamp together to thereby initially align the flanges on the terminal portions of the conduit and deform the deformable insert on further drawing of the split ring "V" clamp members together to thereby provide a conduit joint, whereby each flange forces the body portion of insert closer to the distal end of the radially projecting support members.

6. The method of claim 5 wherein the deformable insert is of metal.

7. The method of claim 5 including the step of adhering the deformable insert to the "V" clamp portions.

* * * * *